(12) United States Patent
Walters

(10) Patent No.: US 9,151,074 B2
(45) Date of Patent: Oct. 6, 2015

(54) FENCING SYSTEM WITH COUPLER CLAMP ASSEMBLY

(71) Applicant: Craig Walters, Cresson, TX (US)

(72) Inventor: Craig Walters, Cresson, TX (US)

( * ) Notice: Subject to any disclaimer, the term of this patent is extended or adjusted under 35 U.S.C. 154(b) by 0 days.

(21) Appl. No.: 14/515,638

(22) Filed: Oct. 16, 2014

(65) Prior Publication Data

US 2015/0123061 A1   May 7, 2015

Related U.S. Application Data

(60) Provisional application No. 61/899,342, filed on Nov. 4, 2013.

(51) Int. Cl.
*E04H 17/14* (2006.01)
*A01K 3/00* (2006.01)

(52) U.S. Cl.
CPC .............. *E04H 17/1421* (2013.01); *A01K 3/00* (2013.01); *E04H 2017/1473* (2013.01)

(58) Field of Classification Search
USPC ............... 403/234–236, 150–159; 256/65.02, 256/65.05, 67
See application file for complete search history.

(56) References Cited

U.S. PATENT DOCUMENTS

| | | | | |
|---|---|---|---|---|
| 1,056,574 | A | * | 3/1913 | Newton .................. 403/236 |
| 1,822,389 | A | * | 9/1931 | Blakely .................. 403/235 |
| 2,715,513 | A | | 8/1955 | Kools |
| 2,764,438 | A | * | 9/1956 | Haviland ................ 403/234 |
| 3,092,407 | A | | 6/1963 | Blonder |
| 3,157,388 | A | | 11/1964 | Nelson |
| 3,648,982 | A | | 3/1972 | Sabel et al. |
| 3,960,367 | A | | 6/1976 | Rogers |
| 4,666,131 | A | | 5/1987 | Kettelkamp, Sr. et al. |
| 5,028,161 | A | * | 7/1991 | Peleg .................... 403/236 |
| D347,377 | S | * | 5/1994 | Nakamura et al. ........ D8/354 |
| 5,452,880 | A | | 9/1995 | Bailey |
| 5,547,169 | A | | 8/1996 | Russell |
| D374,607 | S | * | 10/1996 | Shoda .................... D8/382 |
| 5,593,143 | A | | 1/1997 | Ferrarin |
| 6,386,519 | B1 | * | 5/2002 | Priefert ................. 256/68 |
| D495,434 | S | * | 8/2004 | Cooper ................ D25/133 |

(Continued)

FOREIGN PATENT DOCUMENTS

EP    2278096 A1    1/2011
FR    2874398 A3    9/2009

OTHER PUBLICATIONS

440 Pipe Fence 3-Rail, 440 Fence, 2 pp., retrieved on Aug. 2, 2013, www.440fence.com/440pipefence3rail.

(Continued)

*Primary Examiner* — Victor Macarthur
(74) *Attorney, Agent, or Firm* — Charles D. Gunter, Jr.

(57) ABSTRACT

Shown is a fence post system and a coupling used in such a system for coupling the fence rails and fence posts of metal tubular fences such as those used in horse and cattle ranching operations. A clamp ring is secured about the vertical tubular metal fence post. A pair of clamping body components fit about the horizontal fence rail and are secured by top and bottom tightening bosses and tightening elements. When tightened, the assembly nearly completely circumscribes the exterior surface of the fence rail, providing near 360 degree circumferential contact. The coupling can be articulated in various ways. It can be rotated about the fence post before tightening. It can also be pivoted in a vertical plane to adjust for changes in the elevation of the fence line.

14 Claims, 10 Drawing Sheets

(56) References Cited

U.S. PATENT DOCUMENTS

| | | | |
|---|---|---|---|
| 7,062,836 B1 * | 6/2006 | Sorgi | 29/525.01 |
| D534,792 S * | 1/2007 | Cooper | D8/382 |
| D560,476 S * | 1/2008 | Jones et al. | D8/382 |
| 7,654,506 B1 | 2/2010 | Tai | |
| 7,681,866 B2 | 3/2010 | Lehmann | |
| 7,753,346 B2 | 7/2010 | Arden | |
| D633,374 S * | 3/2011 | Diener | D8/382 |
| 8,453,342 B2 | 6/2013 | Knudsen | |
| 2008/0029748 A1 | 2/2008 | Ford | |
| 2008/0042116 A1 | 2/2008 | Buckley | |
| 2008/0237561 A1 | 10/2008 | Cozby | |
| 2013/0175488 A1 | 7/2013 | Burt et al. | |

OTHER PUBLICATIONS

Preifert Farm Ranch and Rodeo, Ranch Rail Steel Post Fence, Priefert Fence, 5 pp., copyright 2012, www.priefertfence.com/ranchrail.php.

* cited by examiner

FENCING SYSTEM WITH COUPLER CLAMP ASSEMBLY

CROSS REFERENCE TO RELATED APPLICATIONS

This application claims priority from an earlier filed provisional application, Ser. No. 61/899,342, filed Nov. 4, 2013, entitled "Fencing System With Coupler Clamp Assembly," by Craig Walters.

BACKGROUND OF THE INVENTION

1. Field of the Invention

The present invention relates generally to a metal tubular fencing system and to a coupling used in such a system for coupling the fence rails and fence posts of metal tubular fences of the type used in horse and cattle ranching operations.

2. Description of the Prior Art

Modern livestock fences, particularly those used for horse and cattle operations, are often formed from horizontally extending, tubular metal (galvanized steel) rails mounted on vertical tubular posts anchored to the ground. The tubular steel components are typically corrosion protected, as by powder coating, or similar techniques. This type of "tubular steel fence" is widely considered to be superior to traditional split rail and other types of fences because it is rigid and extremely durable. However, in the past, the individual rail sections of the typical steel fence were required to be welded to the vertical fence posts. This welding requirement adds considerable time and labor to building the fence because a portable welder must be employed to weld the opposite ends of each and every rail to the posts on which it is supported. The welds must then be ground to a smooth finish and painted or coated with a protective coating. The welds are subject to rust and peeling, requiring periodic maintenance for the lifetime of the fence.

More recently, a non-welded connector for steel fences has been introduced. This connector, known as the "440 Fence™" connector, is manufactured by the 440 Fence Company of Aubrey, Tex. It is described in U.S. Patent Publication No. 2008/0042116, published Feb. 21, 2008. It is also the subject matter of U.S. Design Pat. No. 495,434. The 440 Fence utilizes two stacked connectors at each joint in the fence. Each connector has a vertical section for slipping over the fence post and a generally horizontal section that receives the end of a rail section. The horizontal section is hinged to the vertical section so as to permit limited pivoting of the horizontal section relative to the vertical section in order to accommodate inclines of the fence. With these connectors, a steel fence can be built without welding, which offers the advantage of significantly reducing labor when compared to traditional steel fence construction. Post-assembly maintenance is also reduced.

However, the 440 Fence™ connector and other connectors presently available in the marketplace still suffer from various drawbacks. For instance, the 440 Fence™ connector and other presently available designs do not utilize mating clamping body pieces to join the connector to the horizontal rail. Instead, the horizontal body piece is received in a one piece tubular body member which is then secured to the horizontal rail by one or more set screws.

The set screw method has several disadvantages. When tightening the set screw, it will tend to penetrate the powder coated paint which is typically used to coat the fence rails, as well as the zinc coating that is on the outside of the tubular pipe, before eventually digging into the bare metal pipe. This can result in exposing bare metal and allow corrosion to begin. If the set screw is severely over tightened, then this can result in deforming the pipe by actually denting the pipe. The set screw design also limits the amount of surface area contact that can be used to hold the pipe, since it is relying on the diameter of the set screw on one side and the contact of the inside and outside diameters of the pipe on the other. Some of these same negative features are present when using set screws on the vertical posts, as well.

A need has therefore arisen for a fence connector or coupling of the above type which uses "clamping" components, rather than set screws to secure the fence components in place.

The use of a two component clamping assembly would allow the fence to be assembled using two different methods because the components that are used to clamp on the horizontal rail are comprised of two pieces. This would allow the fence to be assembled either with both of these pieces being put together first and the pipe inserted later or the pipe can be inserted as these two pieces are being put together. Having this capability is more important if the fence needed to be repaired after the initial installation.

The use of clamping components, rather than the described set screw mounting method is also important because, if the rail is allowed to float as where there are changes in the soil, it can cause the vertical post to shift which can result in the post pulling away from the rail to the point where it comes loose. Also, if livestock contact the rails secured with the set screw method, there is more of a possibility that the rail can flex and the connector and rail can pull loose. Using clamping components on the rail helps prevent this from happening. The strongest fence coupling would feature a pair of mirror image clamping components which allow for near 360° of clamping on both the horizontal rail and the vertical post.

SUMMARY OF THE INVENTION

The improved fencing system of the invention meets the foregoing needs by providing an improved coupler clamp assembly for coupling a vertical tubular metal fence post to a tubular metal fence rail having an exterior surface, and interior surface and a given length. The preferred coupler clamp assembly includes a clamp ring which passes around the vertical tubular metal fence post. The clamp ring has a pair of clamping flanges, each having a tightener receiving opening therein for receiving a tightener element. The clamp ring also has a pair of pivot points located thereon.

First and second clamping body components are also included which are receivable about a portion of the length of the tubular metal fence rail and securable thereto. Each clamping body component has a pipe receiving interior surface for receiving the portion of the tubular metal fence rail. When two mating clamping body components are secured together, they nearly completely circumscribe the exterior surface of the fence rail, providing near 360° circumferential contact.

In the preferred version of the invention, each of the clamping body components has a pivot flange extending therefrom, the pivot flanges each having a pivot point which mates with one of the pivot points provided on the clamp ring, whereby the clamping body components are pivotable with respect to the clamp ring.

Each of the clamping body components is also preferably provided with a top and bottom tightening boss located thereon, whereby a tightening element inserted in the respective tightening bosses can be used to tighten the first and second clamping body components about the fence rail to thereby secure the fence rail to the vertical tubular metal fence post.

The coupler clamp assembly can be used as a part of an improved metal tubular fencing system using a series of vertical tubular metal posts, at least selected ones of which are joined to tubular metal fence rails by the fence coupler clamp assemblies of the invention.

In the method of using the improved fencing system of the invention, the first and second mirror image clamping body component halves can be first assembled and the fence rail then installed within the clamping body component halves. Alternatively, the fence rail can be installed within one of the clamping body component halves and the other body half can then be assembled to complete the coupling. A section of previously installed fence may also be easily repaired using the clamping body components of the invention by simply disassembling the mirror image clamping body component halves.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
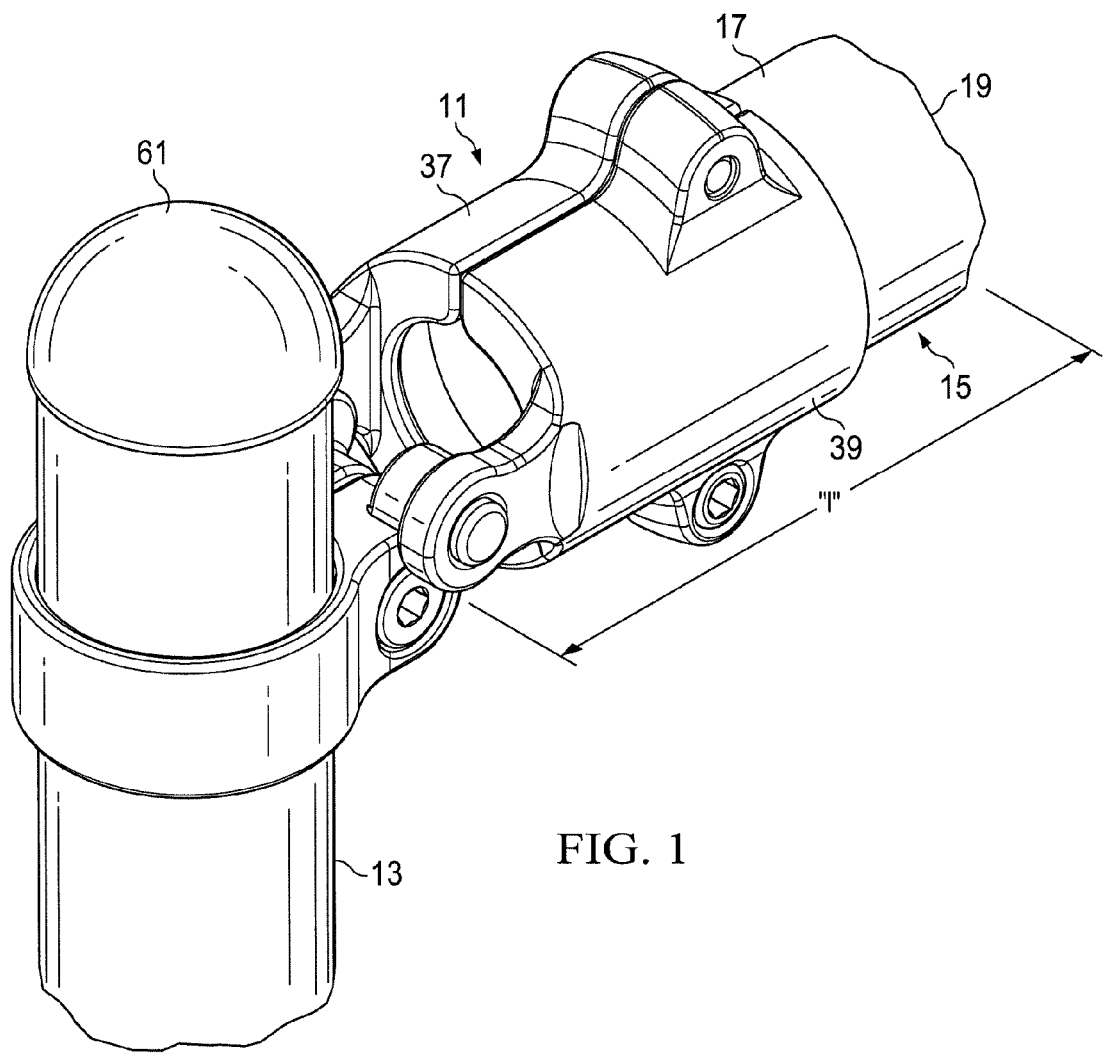
FIG. 1 is a perspective view of portions of a vertical post and horizontal rail of a metal, tubular fence post system of the invention, showing the improved fence post coupling used to join the fence post and rail.

Turning first to FIG. 1, there is shown an improved coupler clamp assembly of the invention, designated generally as 11.

The coupling clamp assembly 11 is used for coupling a vertical tubular metal fence post (shown partly broken away as 13 in FIG. 1) to a tubular metal fence rail (similarly shown broken away as 15 in FIG. 1) having an exterior surface 17, and interior surface 19 and a given length "l". The rail 15 may sometimes be referred to as the "horizontal rail", it being understood that the rail may not always be in a strictly horizontal plane with respect to the surrounding terrain, due to changes in elevation of the terrain.

The fence post 13 and horizontal rail 15 are commercially available components and will typically be formed of a metal such as galvanized steel which is typically coated with some type of corrosion protective coating. In the case of the 440 Fence™ product, as an example, a flat strip steel is cold-formed and electric-resistance or induction welded to form a length of pipe. After welding, the pipe is given a three layer coating of zinc, a conversion coating, and a clear polymer. These details are intended to merely be illustrative of the various types of tubular metal fence components available in the industry and the types of corrosion protection coatings that may be applied.

The improved coupler clamp assembly 11 will now be described in greater detail. The clamp assembly includes a clamp ring 21 (perhaps best seen in FIG. 3) which passes around the vertical tubular metal fence post 13. The clamp ring 21 has a pair of clamping flanges 23, 25, each having a tightener receiving opening 27 therein for receiving a tightener element. In the version of the coupler clamp illustrated in FIG. 3, the tightener element is a socket head clamp screw 29 which passes through a washer 31. The tightener element can be any convenient closure element, such as a bolt or screw assembly. The tightener element or elements could also conveniently comprise mating hex nut and bolt pairs. The clamp ring 21 also has a pair of pivot points located thereon. In the preferred version of the invention shown in FIG. 3, these pivot points are made up by a pair of oppositely extending pivot posts 33, 35 which extend outwardly from each of the two clamping flanges 23, 25, respectively.

Figure 2A:
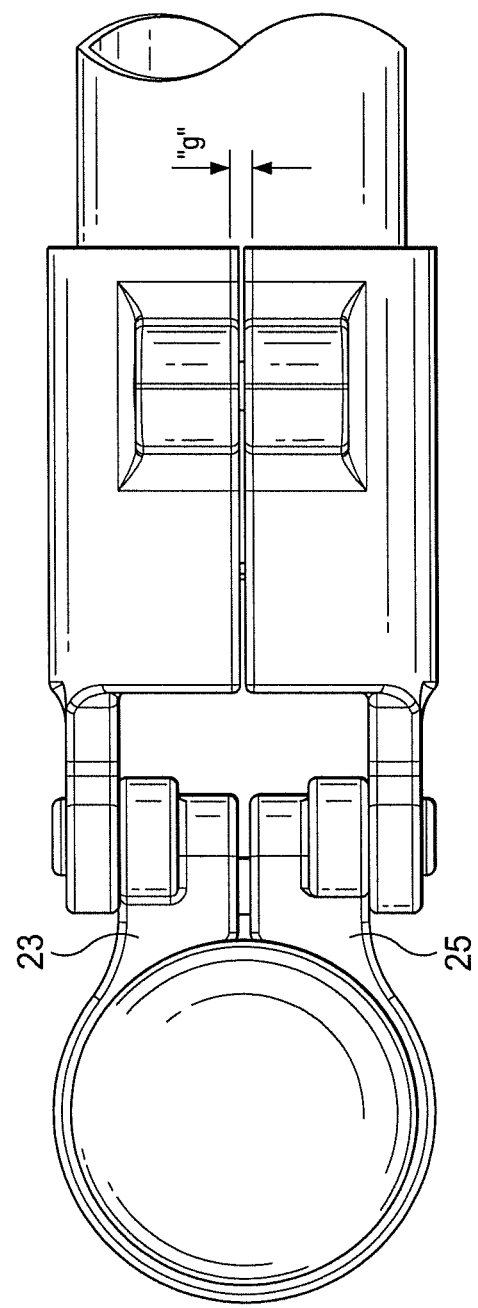
FIG. 2A is a top view of the fence post, rail and coupling of FIG. 1.
Figure 2B:
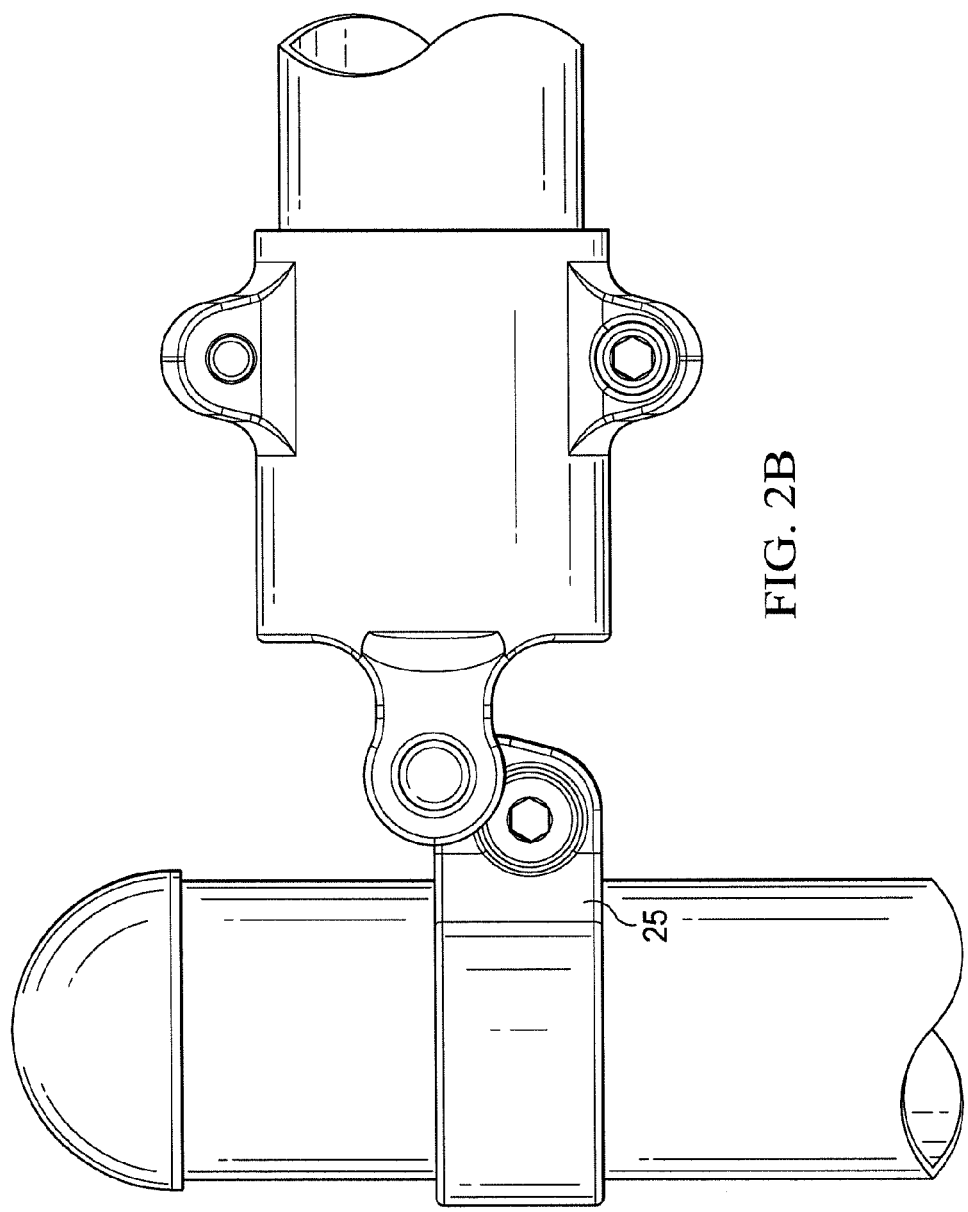
FIG. 2B is a side view of the fence post, rail and coupling of FIG. 1.
Figure 3:
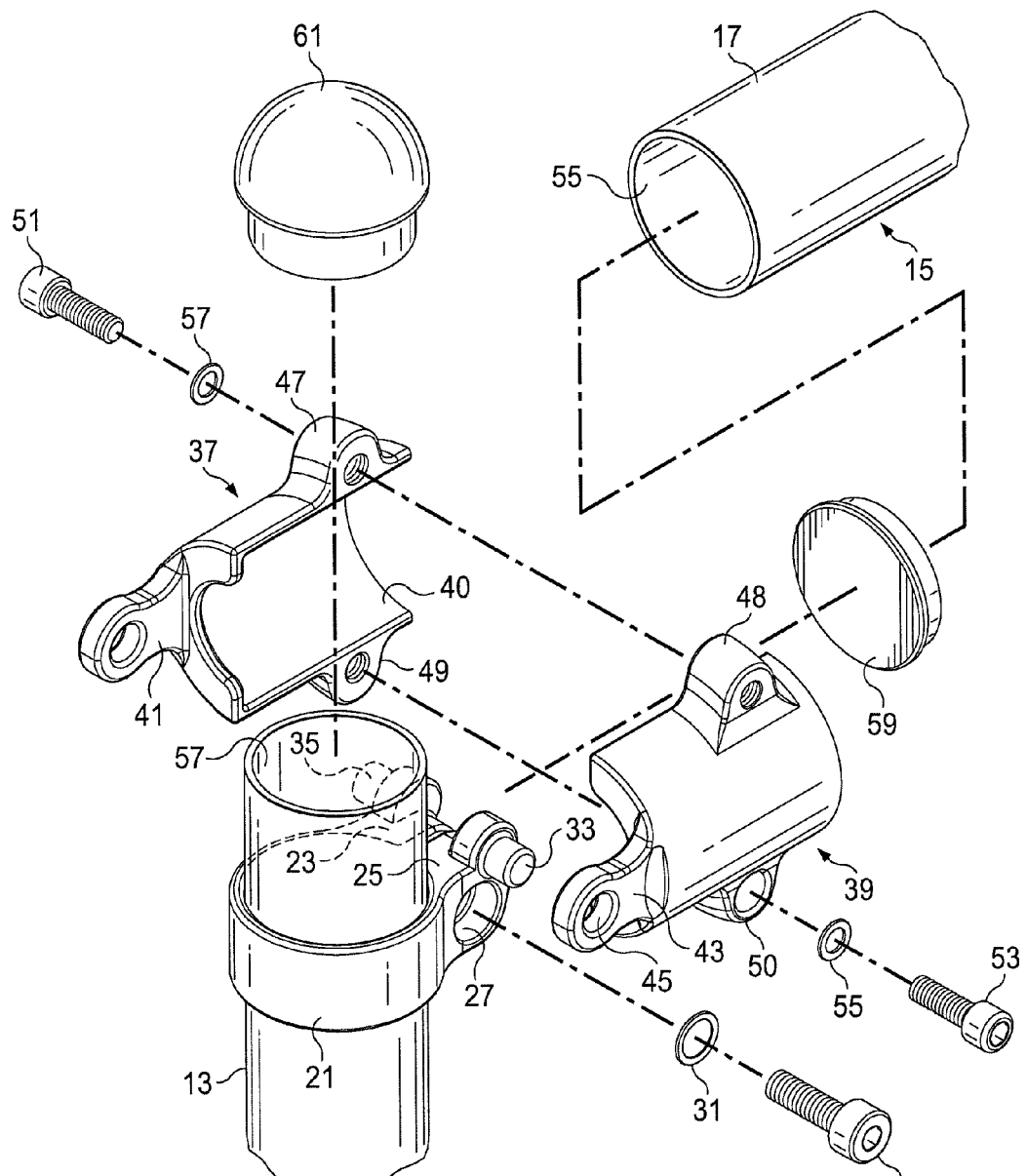
FIG. 3 is an exploded view of the improved fence post coupling of the invention with portions of the fence post and rail being broken away for ease of illustration.

As shown in FIGS. 1-3, first and second clamping body components 37, 39 are receivable about a portion of the length of the horizontal tubular metal fence rail 17 and are securable thereto. Each clamping body component has a pipe receiving interior surface (such as surface 40 in FIG. 3) for receiving the portion of the tubular metal fence rail. The clamping body components 37, 39 are preferably provided as mirror image mating pieces with the interior surfaces 41 nearly completely circumscribing the exterior surface 17 of the horizontal fence rail when the assembly is completed, providing near 360° circumferential contact. By "near 360° degree circumferential contact" is meant that a gap (shown as "g" in FIG. 2A) of only about 1/16 to 1/8 inch remains between the two coupler body component halves upon assembly. The assembled coupler clamp assembly can be seen in FIG. 1. As has been briefly discussed, the "clamping" feature of the assembly of Applicant's device is an important feature which provides a very sturdy assembly even in the case of changes in the surrounding terrain or damage by livestock and the like.

Figure 4:
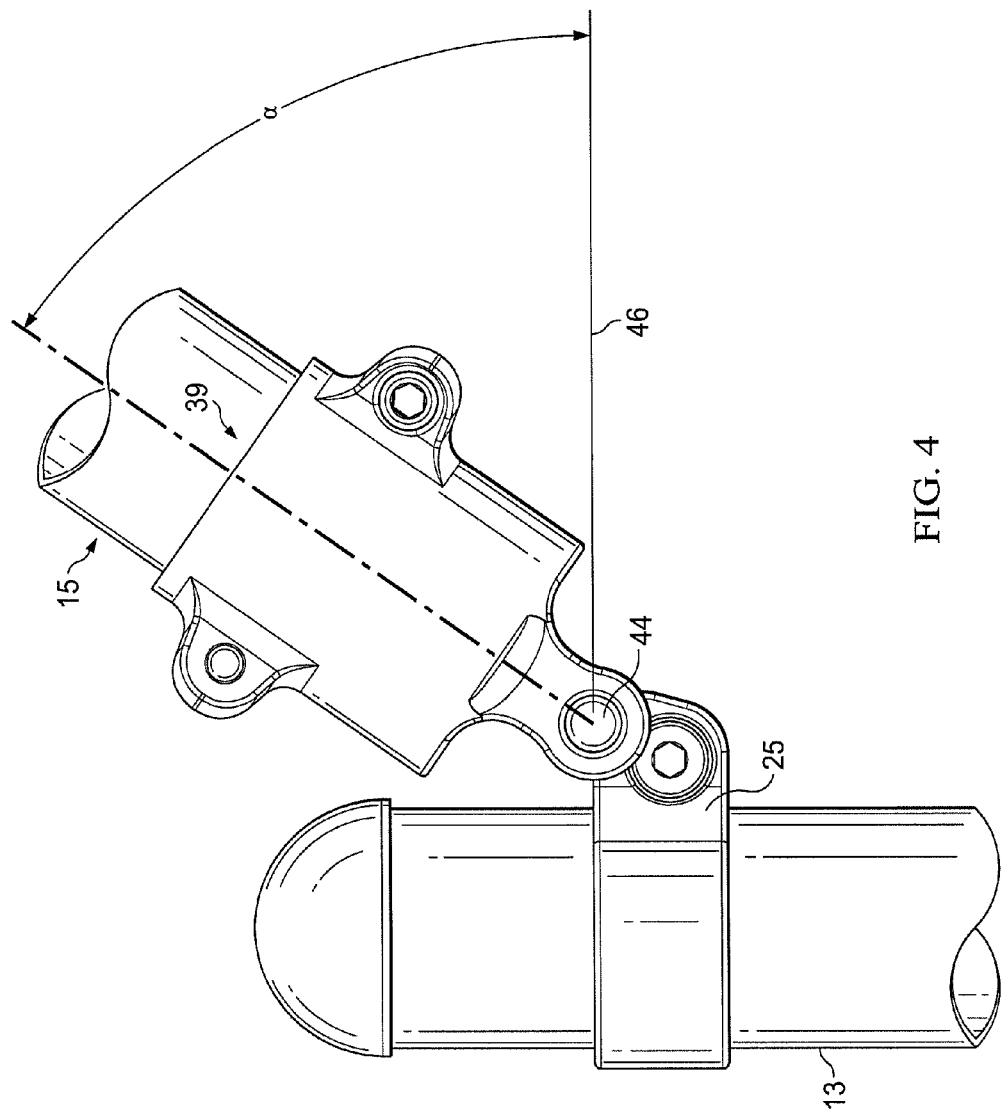
FIG. 4 is a side view of the coupling of the invention in place on portions of a fence post and fence rail, showing the pivoting action of the coupling.
Figures 5A, 6:
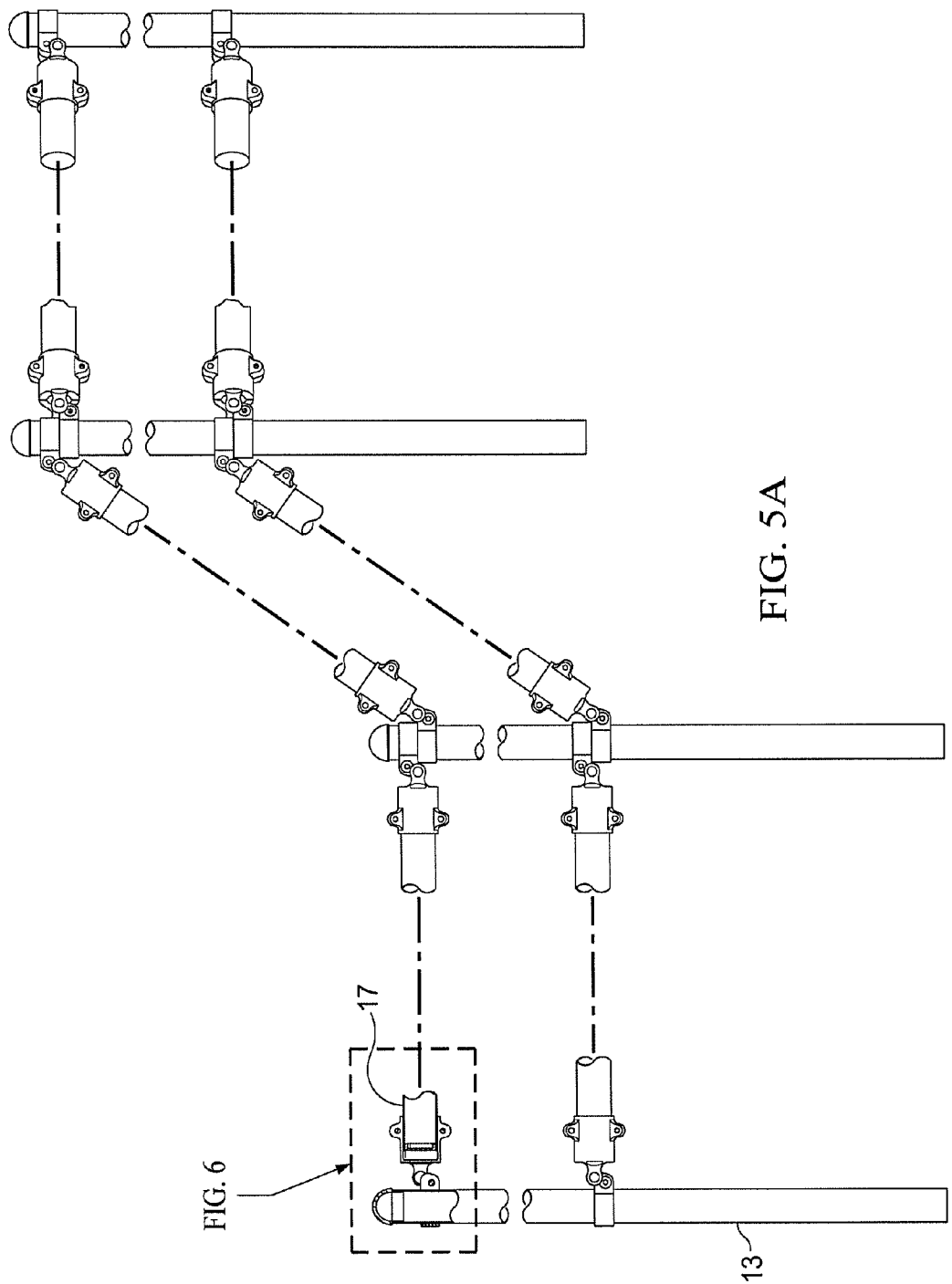
FIGS. 5A and 5B are simplified, side and top views of the fence post system of the invention, with portions of the fence rails broken away, showing the use of the couplings of the invention in accommodating changes in both elevation and direction of the fence.
FIG. 6 is a close-up side cross sectional view of the coupling of the invention, taken along lines VI-VI in FIG. 5A.
Figure 5B:
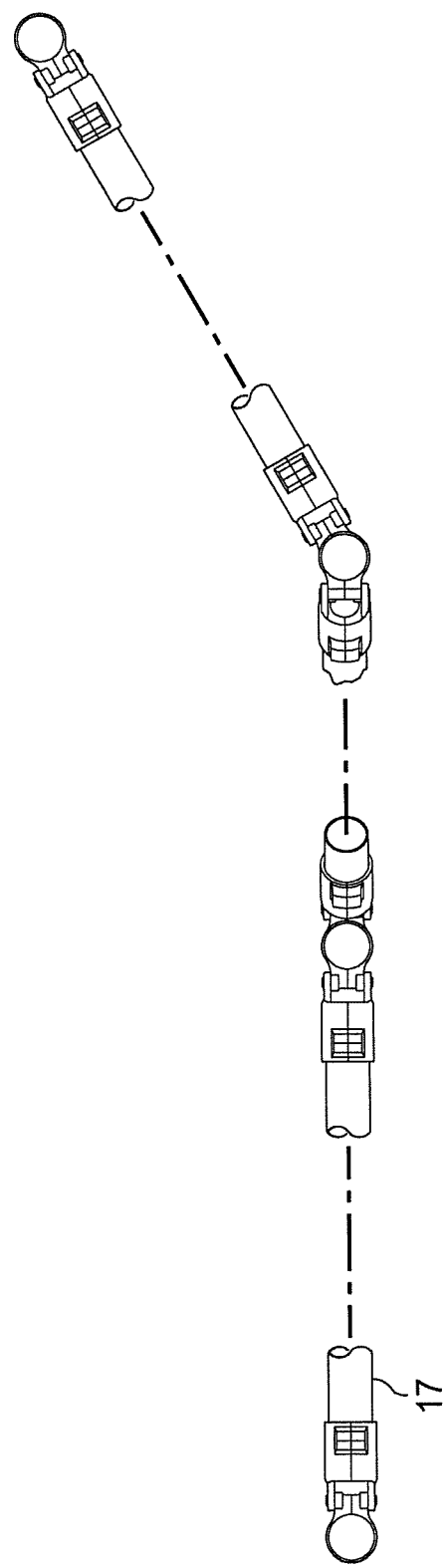
Figure 6:
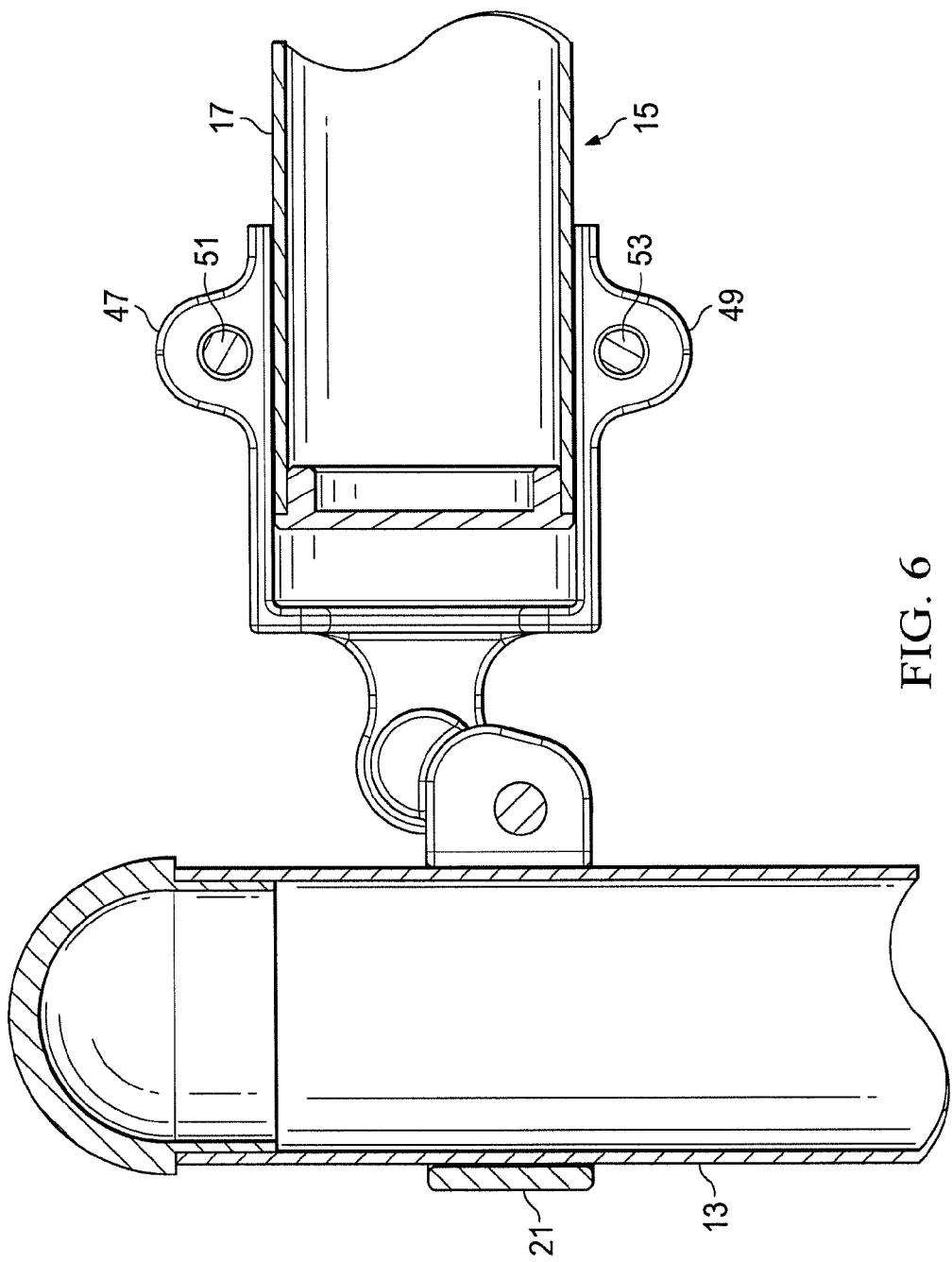

Each of the clamping body components 37, 39 also has a pivot flange 41, 43 extending therefrom. The pivot flanges 41, 43 each has a pivot point which mates with one of the pivot points provided on the clamp ring 21, whereby the clamping body is pivotable with respect to the clamp ring when the two mating halves are assembled. This can be accomplished by providing each of the pivot flanges 41, 43 with a post receiving opening (such as opening 45 in FIG. 3). As illustrated in FIG. 4, the pivot point 44 which is created between the pivot flanges of the mirror image clamping body component halves and the clamp ring allows the horizontal fence rail to pivot through an angle "a" of up and down to about 55° with respect to a horizontal plane 46. This range of angle allows the fencing system to be adjusted for changes in elevation, such as would be encountered in changes in the grade of the surrounding terrain. FIGS. 5A and 5B are intended to illustrate such changes in both elevation and direction of the fencing system of the invention.

Each of the clamping body components 37, 39 also has a top and bottom tightening boss (such as bosses 47, 49 in FIG. 3) located thereon. By "boss" is meant a protuberant part or raised projecting block or mass which extends out from the exterior surface of the clamping body component. The use of bosses is an essential feature of the systems of the invention in that a set screw opening is not utilized. By avoiding the use of set screws, the danger of biting into the metal of the fence component is avoided, thereby avoiding the possibility of corrosion, or of weakening the integrity of the fencing system itself.

A tightening element, such as top tightening element 51 and bottom element 53 (in this case socket head cap screws) are inserted in the respective tightening bosses (47, 49, on the left hand boss and 48, 50 in the right hand boss, as viewed in FIG. 3), using washers 55, 57. In the version of the coupler clamp assembly shown in FIGS. 1-6, the tightening elements 51, 53, are screwed into a mating threaded opening in the respective tightening boss, such as boss 49 shown in FIG. 3.

Figure 7:
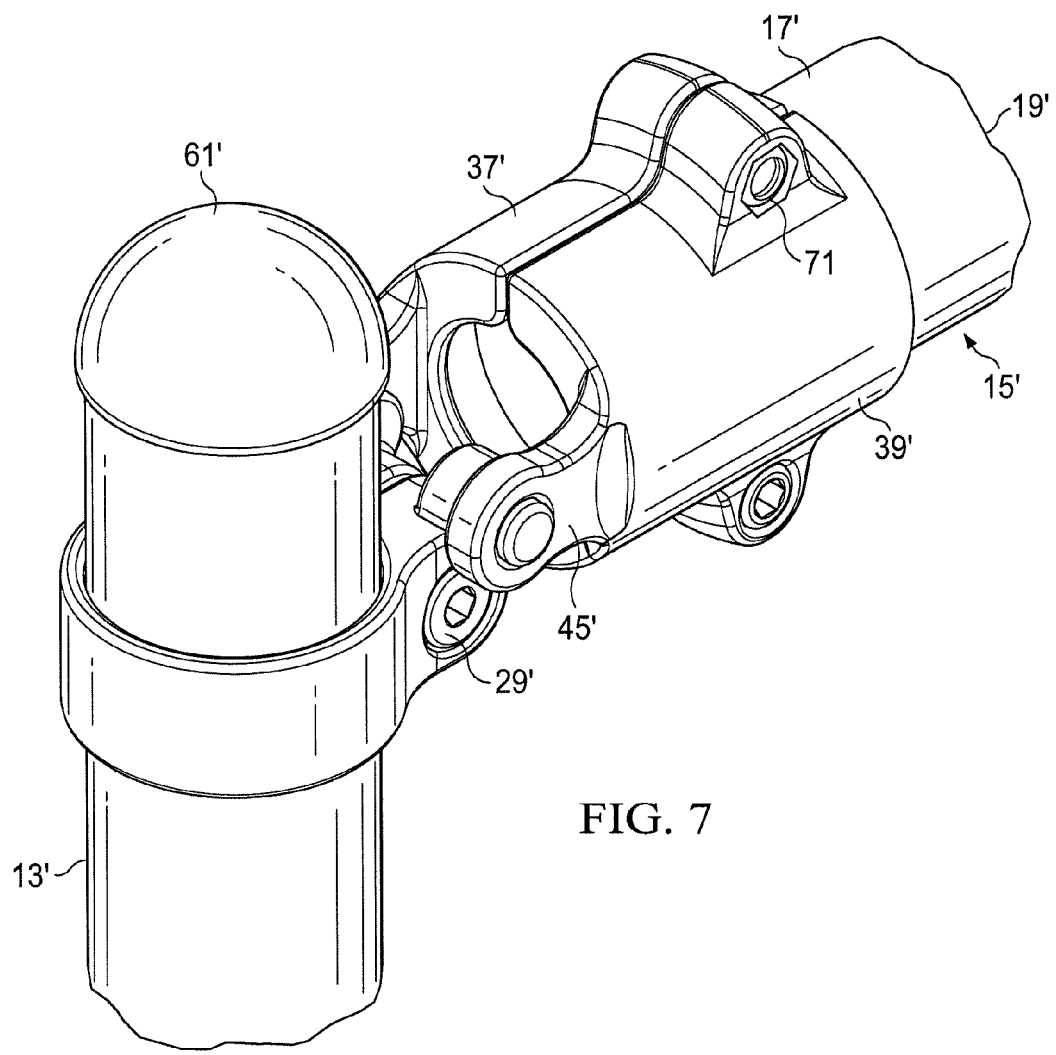
FIG. 7 is a view similar to FIG. 1, except that socket head cap screws and hex nuts are used in the assembly.
Figure 8:
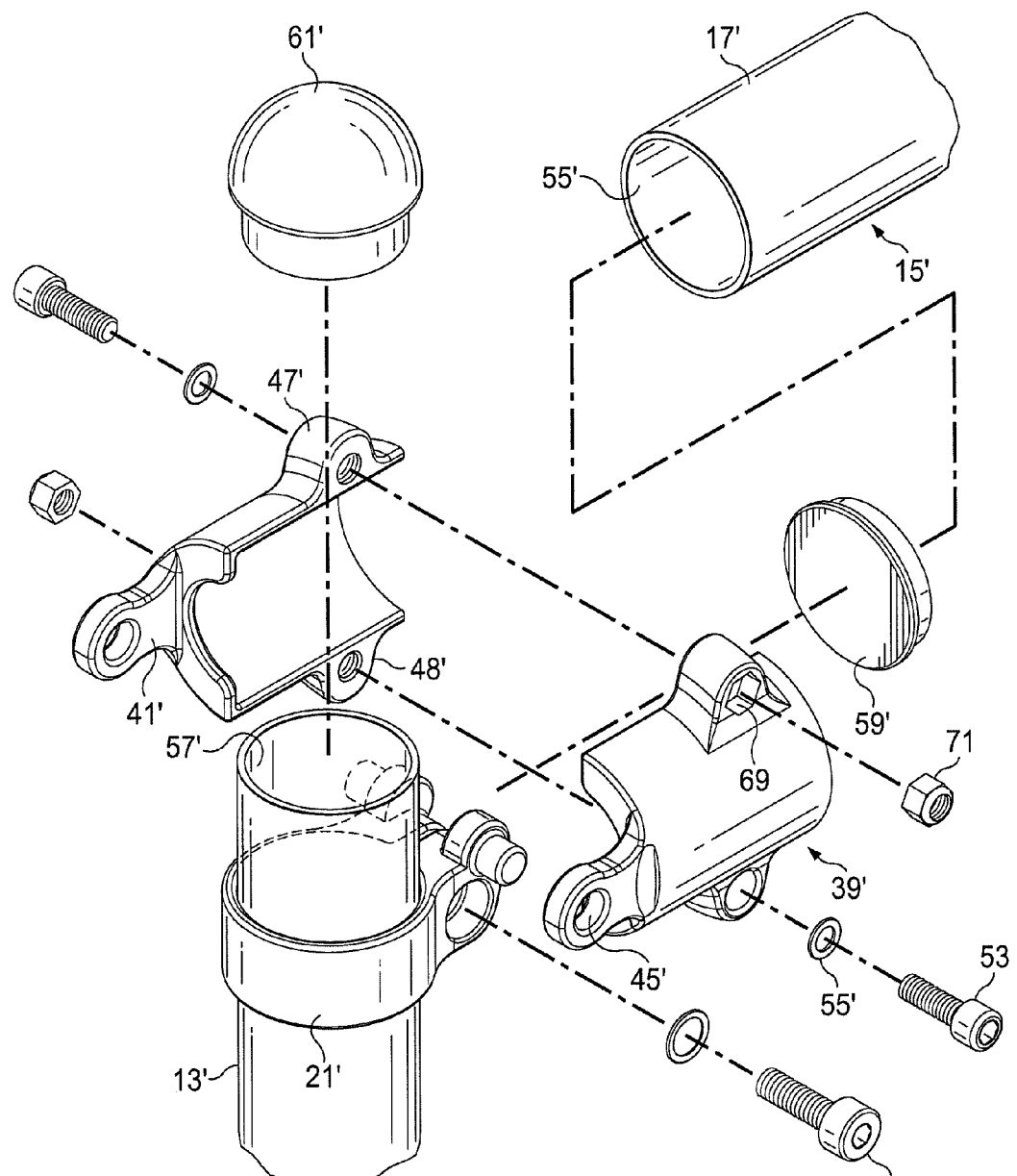
FIG. 8 is a view similar to FIG. 3, but again socket head cap screws and hex nuts are used in the assembly.

FIGS. 7 and 8 are nearly identical to FIGS. 1 and 3, and the common parts in FIGS. 7 and 8 are indicated with primes for simplicity. It will be apparent, however, that FIGS. 7 and 8 show another version of the coupler clamp assembly in which the threaded openings (such as opening 49 in FIG. 3) are eliminated and hex nuts (such as hex nut 71 in FIG. 8) are received in hex shaped openings (such as opening 69 in FIG. 8) in the tightening bosses. Otherwise, the other components remain the same.

The socket head cap screws, hex nuts and tightening bosses are used to tighten the first and second clamping body components 37, 39 about the fence rail to thereby secure the fence rail to the vertical tubular metal fence post, as illustrated in FIG. 1. With reference to FIG. 6, it will be appreciated that the tightening elements 51, 53 pass through imaginary planes spaced apart from the exterior surface 17 of the horizontal rail and do not contact or bite into the exterior surface 17, as would be the case if a set screw arrangement were used to secure the assembly.

As shown in FIG. 3, each of the vertical tubular metal fence post and tubular metal fence rails terminates in an end opening 55, 57. In order to prevent the intrusion of rain or moisture, an end cap 59, 61 will typically be provided for each of the openings.

As has been previously mentioned, in use, the first and second mirror image clamping body component halves can first be assembled and the fence rail then installed within the clamping body component halves. Alternatively, the fence rail can be installed within one of the clamping body component halves and the other body half can then be assembled to complete the fence assembly. The two part nature of the assembly makes it easy to repair a section of the previously installed fence by disassembling the mirror image clamping body component halves.

An invention has been provided with several advantages. The fencing system of the invention is relatively simple in design and economical to manufacture. The system utilizes a method of clamping on the horizontal fence rail, rather than using set screws, as was commonly done in the past. If the horizontal fence rail is allowed to float, as when there are changes in the soil, this action can cause the vertical fence post to shift which will result in the post pulling away from the rail to the point where it may even comes loose. The clamping action of Applicant's fencing system on the horizontal rail helps prevent this from happening. It would also have the same stabilizing effect in the case of livestock contacting the rails in a hard manner which would tend to flex the rails and cause the rails to pull loose.

By avoiding the use of set screws, Applicant's particular coupler clamps provide a fencing system with better corrosion protection and also greater overall integrity. As has been explained, when tightening the set screw it will tend to penetrate the powder coated paint as well as the zinc coating that is on the outside of the pipe before eventually digging into the bare metal pipe. This can result in exposing bare metal and allow corrosion to begin. If the set screw is severely over tightened then this can result in deforming the pipe by putting a dent in the pipe and affecting the overall integrity of the fencing system. The set screw design also limits the amount of surface area contact that can be used to hold the pipe, since it is relying on the diameter of the set screw on one side and the contact of the inside and outside diameters of the pipe on the other. Some of these same negative features apply when using set screws on the vertical posts as well. These disadvantages are overcome by the previously described unique features of Applicant's coupler clamp design.

Applicant's design allows for almost 360° of clamping on both the horizontal rail and the vertical post. This provides a very secure and stable assembly. The design also allows the fence to be assembled using two different methods, because the components that are used to clamp on the horizontal rail are comprised of two pieces. This allows the fence to be assembled either with both of these pieces being put together first and the pipe inserted later or the pipe can be inserted as these two pieces are put together. Having this capability is more important if the fence needed to be repaired after the initial installation.

While the invention has been shown in several of its forms, it is not thus limited but is susceptible to various changes and modifications without departing from the spirit thereof.

What is claimed is:

1. A coupler clamp assembly for coupling a vertical tubular metal fence post to a tubular metal fence rail in a fencing system, where the tubular metal fence rail has an exterior surface, and interior surface and a given length, the coupler clamp assembly comprising:

a clamp ring adapted to pass around the vertical tubular metal fence post, the clamp ring having a pair of clamping flanges, each having a tightener receiving opening therein for receiving a tightener element, whereby the clamp ring provides near 360 degree circumferential contact with the vertical tubular metal fence post in a fencing system when the tightener elements are tightened, the clamp ring being independently supportable on the vertical tubular metal fence post when the tightener element is tightened, the clamp ring also having a pair of pivot points located thereon;

first and second clamping body components separate from the clamp ring which are adapted to be received about a portion of the length of the tubular metal fence rail and securable thereto, each clamping body component having a pipe receiving interior surface for receiving the portion of the tubular metal fence rail and nearly completely circumscribing the exterior surface of the fence rail, providing near 360 degree circumferential contact when used in a fencing system;

wherein each of the clamping body components has a pivot flange extending therefrom, the pivot flanges each having a pivot point defined by a pivot surface which fits over and contains one of the pivot points provided on the clamp ring, whereby the clamping body is pivotable with respect to the clamp ring when used in a fencing system, and whereby the clamping body components are removable from the vertical tubular metal fence post without removing the clamp ring;

each of the clamping body components also having a top and bottom tightening boss located thereon at a location overlaying and circumscribing a portion of the exterior surface of the tubular metal fence rail when the fence rail is received within the pipe receiving interior surface of the first and second clamping body components, whereby a tightening element inserted in the respective tightening bosses can be used to tighten the first and second clamping body components about the fence rail when used in a fencing system to thereby clamp the fence rail and secure the fence rail to the vertical tubular metal fence post.

2. The coupler clamp assembly of claim 1, wherein each of the vertical tubular metal fence post and tubular metal fence rails terminates in an end opening and wherein the fence post system also includes an end cap for each of the openings.

3. A coupler clamp assembly for coupling a vertical tubular metal fence post to a tubular metal fence rail in a fencing system, where the tubular metal fence rail has an exterior surface, and interior surface and a given length, the coupler clamp assembly comprising:

a clamp ring adapted to pass around the vertical tubular metal fence post, the clamp ring having a pair of clamping flanges, each having a tightener receiving opening therein for receiving a tightener element, whereby the clamp ring provides near 360 degree circumferential contact with the vertical tubular metal fence post in a fencing system when the tightener elements are tightened, the clamp ring being independently supportable on the vertical tubular metal fence post when the tightener element is tightened, the clamp ring also having a pair of oppositely extending pivot posts located thereon;

first and second mirror image clamping body component halves separate from the clamp ring which are adapted to be received about a portion of the length of the tubular metal fence rail and securable thereto, each clamping body component half having a pipe receiving interior surface for receiving the portion of the tubular metal fence rail and nearly completely circumscribing the exterior surface of the fence rail, providing near 360 degree circumferential contact when used in a fencing system;

wherein each of the clamping body component halves has a pivot flange extending therefrom, the pivot flanges each having a post receiving opening formed therein for receiving a pivot post of the associated clamp ring, whereby the post receiving opening fits over and contains the pivot post whereby a pivot point is created with respect to the clamp ring when used in a fencing system, whereby the clamping body components are removable from the vertical tubular metal fence post without removing the clamp ring;

each of the mirror image clamping body component halves also having a top and bottom tightening boss located thereon at a location overlaying and circumscribing a portion of the exterior surface of the tubular metal fence rail when the fence rail is received within the pine receiving interior surface of the first and second clamping body components, whereby a tightening element inserted in the respective tightening bosses can be used to tighten the first and second clamping body component halves about the fence rail when used in a fencing system to thereby secure the fence rail to the vertical tubular metal fence post.

4. The coupler clamp assembly of claim 3, wherein the tightener element and the tightening element are selected from among the group consisting of bolts and screws.

5. The coupler clamp assembly of claim 4, wherein the tightener element is a socket head cap screw.

6. The coupler clamp of claim 4, wherein the tightener element is as mating hex nut and socket head cap screw pair.

7. The coupler clamp assembly of claim 3, wherein the pivot point established between the pivot flanges of the mirror image clamping body component halves and the clamp ring allows the fence rail to pivot through an angle of up and down to about 55 degrees with respect to a horizontal plane.

8. A fencing system using a series of vertical tubular metal posts coupled to tubular metal fence rails each having an exterior surface, an interior surface and a given length by coupler clamp assemblies, the combination comprising;

at least one vertical tubular metal post joined to a tubular metal fence rail by a coupler clamp assembly, the coupler clamp assembly comprising:

a clamp ring which passes around the vertical tubular metal fence post, the clamp ring having a pair of clamping flanges, each having a tightener receiving opening therein for receiving a tightener element, whereby the clamp ring provides near 360 degree circumferential contact with the vertical tubular metal fence post when the tightener elements are tightened, the clamp ring being independently supported on the vertical tubular metal fence post when the tightener element is tightened, the clamp ring also having a pair of pivot points located thereon;

first and second clamping body components separate from the clamp ring which are received about a portion of the length of the tubular metal fence rail and securable thereto, each clamping body component having a pipe receiving interior surface which receives the portion of the tubular metal fence rail and nearly completely circumscribing the exterior surface of the fence rail, providing near 360 degree circumferential contact;

wherein each of the clamping body components has a pivot flange extending therefrom, the pivot flanges each having a pivot point defined by a pivot surface which fits over and contains one of the pivot points provided on the clamp ring, whereby the clamping body is pivotable with respect to the clamp ring, whereby the clamping body components are removable form the vertical tubular metal fence post without removing the clamp ring;

each of the clamping body components also having a top and bottom tightening boss located thereon, at a location overlaying and circumscribing a portion of the exterior surface of the tubular metal fence rail when the fence rail is received within the pipe receiving interior surface of the first and second clamping body components:

a tightening element inserted in each the respective tightening bosses, the tightening elements being used to tighten the first and second clamping body components about the fence rail to thereby secure the fence rail to the vertical tubular metal fence post.

9. A method for connecting the components of a metal fence post system which uses a series of vertical tubular metal posts, at least selected ones of which are joined to tubular metal fence rails by coupler clamp assemblies, the tubular metal fence rails each having an exterior surface, an interior surface and a given length, the method comprising;

providing a fence post coupler clamp assembly for coupling at least one vertical tubular metal post to a tubular metal fence rail, where the coupler clamp assembly comprises:

a clamp ring which passes around the vertical tubular metal fence post, the clamp ring having a pair of clamping flanges, each having a tightener receiving opening therein for receiving a tightener element, whereby the clamp ring provides near 360 degree circumferential contact with the vertical tubular metal fence post when the tightener elements are tightened, the clamp ring being independently supported on the vertical tubular metal fence post when the tightener element is tightened, the clamp ring also having a pair of pivot points located thereon;

first and second clamping body components separate from the clamp ring which are receivable about a portion of the length of the tubular metal fence rail and securable thereto, each clamping body component having a pipe receiving interior surface for receiving the portion of the tubular metal fence rail and nearly completely circumscribing the exterior surface of the fence rail, providing near 360 degree circumferential contact;

wherein each of the clamping body components has a pivot flange extending therefrom, the pivot flanges each having a pivot point defined by a pivot surface which fits over and contains one of the pivot points provided on the clamp ring, whereby the clamping body is pivotable with respect to the clamp ring, the clamping body components being removable from the vertical tubular metal fence post without removing the clamp ring;

each of the clamping body components also having atop and bottom tightening boss located thereon at a location overlaying and circumscribing a portion of the exterior surface of the tubular metal fence rail when the fence rail is received within the pipe receiving interior surface of the first and second clamping body components, whereby a tightening element inserted in the respective tightening bosses can be used to tighten the first and second clamping body components about the fence rail to thereby secure the fence rail to the vertical tubular metal fence post;

first, passing the clamp ring about the vertical post and tightening the tightener elements so that the clamp ring is independently supported on the vertical post; and thereafter, securing the first and second clamping body components about the tubular metal fence rail by tightening the tightening elements.

10. The method of claim 9, wherein the first and second mirror image clamping body component halves are first assembled and the fence rail is then installed within the clamping body component halves.

11. The method of claim 9, wherein the fence rail is installed within one of the clamping body component halves and the other body half is then assembled to complete the coupling.

12. The method of claim 9, further comprising the steps of:
repairing a section of the previously installed fence by disassembling the mirror image clamping body component halves and removing the tubular metal fence rail while leaving the clamp ring on the vertical tubular metal fence post.

13. The method of claim 9, further comprising the steps of:
providing a change in elevation for the metal fence post system by pivoting the clamping body components up or down relative to the clamp ring.

14. The method of claim 9, further comprising the steps of:
providing a change in direction for the metal fence post system by rotating the clamp ring about the vertical tubular metal fence post.

* * * * *